United States Patent Office 3,828,041
Patented Aug. 6, 1974

3,828,041
6-SUBSTITUTED 3-NITROIMIDAZO[1,2-b]PYRID-AZINES AND METHOD OF PREPARING SAME
Andrew Stephen Tomcufcik, Old Tappan, N.J., and Patrick Thomas Izzo and Paul Frank Fabio, Pearl River, N.Y., assignors to American Cyanamid Company, Stamford, Conn.
No Drawing. Continuation-in-part of abandoned applications Ser. No. 118,508, Feb. 24, 1971, and Ser. No. 118,510, Feb. 24, 1971. This application Sept. 28, 1972, Ser. No. 293,234
Int. Cl. C07d 51/04
U.S. Cl. 260—250 AC     10 Claims

ABSTRACT OF THE DISCLOSURE

The preparation of 6-substituted oxo, thio or amino-3-nitroimidazo[1,2-b]pyridazines which may have a substituent in the 2-position are described. One method is the nitration in the 3-position of the substitued imidazo [1,2-b]pyridazine to give the desired product. Other methods are described. The compounds are useful for their anti-protozoal activity particularly as anti-amebic and anti-trichomonal agents.

---

This application is a continuation-in-part of Applications Serial No. 118,508, filed February 24, 1971, now abandoned and Application Serial No. 118,510, filed February 24, 1971, now abandoned.

SUMMARY OF THE INVENTION

This invention relates to 6-mono or 2,6-disubstituted 3-nitroimidazo[1,2-b]pyridazines and methods of preparing the same.

The compounds of this invention may be illustrated by the following formula:

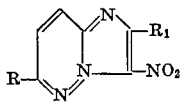

wherein R is hydroxy, mercapto, alkoxy ($C_1$-$C_8$) alkylthio ($C_1$-$C_8$), phthalimidoloweralkoxy, phenyllower-alkoxy, lower alkylaminoloweralkoxy, lower alkoxyloweralkoxy, hydroxyloweralkoxy, lower alkenyloxy, halobenzoylloweralkoxy, amino, alkyl ($C_1$-$C_8$) amino, dialkyl ($C_1$-$C_8$) amino, di(hydroxyloweralkyl)amino, hydroxyloweralkylamino, lower alkoxyloweralkylamino, lower alkenylamino, phenylloweralkylamino, pyridylloweralkylamino, cycloalkyl ($C_3$-$C_6$) amino, diloweralkylaminoloweralkylamino, 1-piperidinyl, 1-pyrrolidinyl, 4-loweralkyl-1-piperazinyl, 4-lower alkoxyphenyl-1-piperazinyl, morpholino, imidazolyl, 4-carboloweralkoxy-1-piperazinyl or 4-diloweraminoloweralkyl-1-piperazinyl; $R_1$ is hydrogen or loweralkyl and a pharmaceutically acceptable acid addition salt thereof.

In the above compounds, lower alkyl are those having 1 to 4 carbon atoms; lower alkenyl those having 2 to 4 carbon atoms; lower alkoxy those having 1 to 4 carbon atoms; lower alkanoyl those having 1 to 4 carbon atoms in addition to the carbonyl group and halo those having chlorine, bromine, iodine and fluorine present. The compounds are in general, crystalline solids in which the amino compounds in the form of their salts are water soluble.

The present compounds can be prepared by the following methods:

A. The reaction of 6-mono or 2,6-disubstitutedimidazo-[1,2-b]pyridazines with nitric and sulfuric acid which can be illustrated as follows:

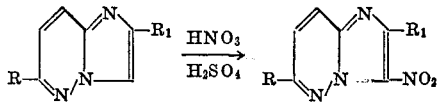

wherein R and $R_1$, are as hereinbefore defined. The reaction can be carried out at a temperature of from 20° C. to about 75° C. It is preferable to use about 70% nitric acid with about 96% sulfuric acid. When the reaction is carried out above room temperature, then lower concentrations of acids are suitable.

B. In the reaction to produce oxo or thio derivatives of a 6-halo-2-substituted or unsubstituted 3-nitroimidazo [2,1-b]-pyridazine is reacted with an alkali metal salt which is illustrated as follows:

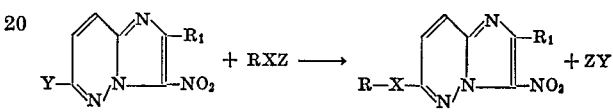

wherein R and $R_1$ are as defined hereinbefore and X is oxygen or sulfur, Y is halogen and Z is an alkali metal. This reaction is preferably carried out in a solvent such as methanol, ethanol, propanol, butanol, dioxane and the like. The temperature at which the reaction is conducted is not critical and may vary from 15° C. to about 60° C. no advantage is generally noted by carrying out the reaction above room temperature.

C. The reaction of a 6-alkali metal oxo or thio-2-substituted or unsubstituted 3-nitroimidazo[1,2-b]pyridazine with a halogen compound is illustrated as follows:

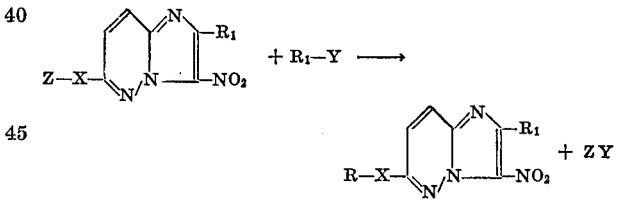

wherein R, $R_1$, X, Y and Z are as hereinbefore defined. This reaction is carried out under conditions similar to that described for reaction B.

The amino compounds of the present invention can be prepared from intermediates described in the prior art. The following references describe the preparation of starting materials: *Tetrahedron* Vol. 24 pp. 239 to 249 (1968).

The amino compounds of the invention may also be prepared by the following general procedures:

D.

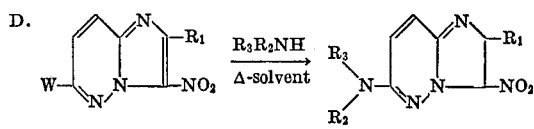

wherein $R_1$ is hereinbefore defined, $R_2$ is hydrogen, alkyl ($C_1$-$C_8$), hydroxy lower alkyl, loweralkoxyloweralkyl, loweralkenyl, phenylloweralkyl, pyridylloweralkyl, cycloalkyl ($C_3$ to $C_6$) or diloweralkylaminoloweralkyl; $R_3$ is hydrogen, lower alkyl or hydroxy loweralkyl;

taken together is piperidinyl, pyrrolidinyl, 4-lower alkylpiperazinyl, 4-lower alkoxyphenylpiperazinyl, morpholino, imidazolyl, 4-carboloweralkoxypiperazinyl or 4-diloweralkylamino lower alkylpiperazinyl and pharmaceutically acceptable acid addition salts thereof. This reaction wherein W is halogen, can be carried out in a solvent such as methanol, ethanol, propanol, dimethylformamide, methoxyethanol, triethylamine, trimethylamine and the like. The temperature of the reaction may vary from about 50° to 150° C. When the amine reactant is a liquid, the reaction can be carried out without the addition of a solvent.

The present compounds are useful for their anti-protozoal activity such as anti-trichomonal and anti-amebic activity in warm-blooded animals. They may be used orally or parenterally in dosages in the range of from about 0.5 mg. to 30 mg. per kilogram of warm-blooded animal per day. They can be formulated with the usual pharmaceutical carriers.

The amebicidal properties of the present compounds are measured by means of an assay devised from W. R. Jones, "The Experimental Infection of Rats with *Entamoeba Histolytica* and a Method for Evaluating the Anti-Amoebic Properties of New Compounds," *Annals of Tropical Medicine and Parasitology*, volume 40, pages 130–140 (1946). The assay is carried out as follows:

The test organism is *Entamoeba histolytic* NIH 200µ. Cultures are maintained on Cleveland Collier liver infusion medium with serum saline 1:1 overlay in 3 x 5 test tube slants. Rice powder is added as a growth factor. Cultures are transferred at five day intervals and kept at 37° C. A 48 hour culture is used for the test inoculum and harvested the morning of the test by collecting the sediment containing rice powder and amoebae found at the junction of the butt and the slant. The amoebae are counted and the amount of inoculum for injection is adjusted to contain approximately 200,000 to 250,000 amoebae. Female Wistar strain albino rats from the Royalhart Farms weighing 20–35 grams are used. The cecum is exposed during laporotomy and the amoebae-rich inoculum is injected into the anterior section. The incision is closed with autoclips. Procedures are sterile throughout the course of the surgery. The infected rats are divided randomly into groups of 10. Treatment is begun on the day of infection. Drugs are premixed in a standard laboratory feed sold as Purina Lab. Chow by the Ralston Purina Company. Rats are maintained on the drug diet for five days at the end of which they are necropsied and the cecum examined both macroscopically for pathologic feature of infection and microscopically for the presence of amoebae. Scores of one each are recorded for evidences of mucous, fibrosus, and lesions of inflammation. A score of one is recorded for a finding of 1–20 amoeba and a score of 2 for a finding of more than 20 amoeba on a standard slide preparation. Total score of 0–5, thus, is possible per rat at necrospy. The arithmetic mean of the combined A.D.I's (Average Degree of Infection) in a test or control group of rats is considered to be the group ADI. Activities are expressed in percent of suppression of group ADI of a test group to the group ADI or a control group. Consumption of test compound is determined from the weight of feed consumed. For example, the compounds 6-methoxy-3-nitroimidazo[1,2-b]pyridazine and 6-ethoxy-3-nitroimdazo[1,2-b]pyridazine have a minimum effective dose (60% supp. of control ADI) mg./kg./day x 5 of about 30.

The following Table I shows the amebicidal activity of representative amino or substituted compounds of the present invention.

TABLE I

The action of imidazopyridazines against experimental intestinal amebiasis in rats

[All compounds are tested initially to 0.025% drug concentration in the diet (approximately 30 mg./kg./day X 5)]

| Compound | Minimum effective dose (60% supp. of control A.D.I.), mg./kg./day X5 (diet) |
|---|---|
| 6-dimethylamino-3-nitroimidazo[1,2-b]pyridazine | 15 |
| 6-(4-methyl-1-piperazinyl)-3-nitroimidazo[1,2-b]pyridazine | 30 |
| 6-diethylamino-3-nitroimidazo[1,2-b]pyridazine | 30 |
| 6-amino-3-nitroimidazo[1,2-b]-pyridazine | 15 |
| 6-(3-methoxypropylamino)-3-nitroimidazo[1,2-b]pyridazine | 30 |
| 6-dimethylamino-2-methyl-3-nitroimidazo[1,2-b]pyridazine | 30 |
| 6-di(n-butyl)amino-3-nitroimidazo[1,2-b]pyridazine | 30 |
| 3-nitro-6-(1-pyrrolidino)-imidazo[1,2-b]pyridazine | 30 |
| 6-(benzylmethylamino)-3-nitroimidazo[1,2-b]pyridazine | 30 |
| 6-allylamino-3-nitroimidazo[1,2-b]pyridazine | 30 |
| 6-(n-butyl)methylamino-3-nitroimidazo[1,2-b]pyridazine | 30 |
| 6-(3-dimethylaminopropylamino)-3-nitroimidazo[1,2-b]-pyridazine | 30 |
| 6-n-butylamino-3-nitroimidazo[1,2-b]pyridazine | 30 |
| 6-dimethylamino-3-nitroimidazo[1,2-b]pyridazine methyl p-toluenesulfonate | 30 |
| 6-[4-(3-dimethylaminopropyl)-1-piperazinyl]-3-nitroimidazo-[1,2-b]pyridazine dihydrochloride | 30 |
| 6-cyclopropylamino-3-nitroimidazo[1,2-b]pyridazine | 30 |
| 6-methoxy-3-nitroimidazo-[1,2-b]pyridazine | 7 |
| 6-ethoxy-3-nitroimidazo-[1,2-b]pyridazine | 27 |
| 6-(2-dimethylaminoethoxy)-3-nitroimidazo[1,2-b]pyridazine | 74 |
| 6-(2-ethoxyethoxy)-3-nitroimidazo[1,2-b]pyridazine | 78 |
| 6-(n-propoxy)-3-nitroimidazo[1,2-b]pyridazine | 20 |
| 6-(2-hydroxyethoxy-3-nitroimidazo[1,2-b]pyridazine | 10 |

The present compounds have shown activity as trichomonicides in tests designated to detect this activity. One such test is carried out as follows:

Female albino mice (Royalhart ICR strain) are inoculated subcutaneously with 50,000 to 100,000 *Trichomonas vaginalis* (Thoms strain) suspended in a cysteine-peptone-liver infusion-maltose medium described by Garth Johnson and Ray E. Trussell, "Experimental Basis for the Chemotherapy of *Trichomonas vaginalis* Infestations I," *Proceedings of the Society for Experimental Biology and Medcine*, Volume 54, pages 245–249 (1943). In control animals, approximately one week postinoculation, the site of inoculation is marked by a subcutaneous abcess which contains numerous trichomonads in a menstruum of pus. In effectively treated animals the abcessess are either undetectable or greatly reduced in size, and motile trichomonads cannot be detected in the lesion-derived material after prolonged microscopic examination. Pressure of a single motile trichomad after treatment is recorded as a negative result.

Treatment by test drugs consists either of one or more oral doses suspended in 0.2% agar and administered by gavage one day post inoculation, or by administration in the diet for five consecutive days beginning one day postinoculation. The diet is a commercial laboratory feed sold as Purina Lab. Chow by the Ralston-Purina Company. The test compound is mixed thoroughly in the carrier, 0.2% agar, 0.5% carboxymethylcellulose or ground laboratory feed. Each regimen is administered to a test group consisting of five or ten mice. Control groups of five or ten mice receive the carrier alone. Gavage doses are estimated for the average mouse weight obtained just before dosing. Drug intakes resulting from diet therapy are estimated for average mouse weights and total group feed intakes during the treatment period. Activities of many compounds of the present invention in this test are comparable to that of 2 - methyl-5-nitro-1-imidazoleethanol, a well recognized commercial trichomonicide. The following Table II shows the activity against *Trichomonas vaginalis* of representative compounds of the present invention.

TABLE II

The action of representative nitroimidazopyridazines of the present invention against subcutaneous *Trichmonoas vaginalis* infections in mice

| Compound | No. cleared[a]/No. treated after a single gavage dose of mg./kg. | | | | | |
|---|---|---|---|---|---|---|
|  | 100 | 60 | 25 | 12.5 | 6.2 | 3.1 |
| 6-methoxy-3-nitroimidazo[1,2-b]pyridazine | 1/5 | 10/10 | 30/30 | 20/20 | 29/30 | 17/20 |
| 6-ethoxy-3-nitroimidazo[1,2-b]-pyridazine |  | 10/10 | 4/10 | 9/10 | 15/30 | [b] |
| 6-hydroxy-3-nitroimidazo[1,2-b]-pyridazine | 4/10 |  |  |  |  |  |
| 6-methoxy-2-methyl-3-nitroimidazo-[1,2-b]pyridazine |  | 10/10 | 3/18 |  |  |  |
| 6-methylthio-3-nitroimidazo-[1,2-b]pyridazine |  | 6/10 | 0/5 |  |  |  |
| 6-n-butoxy-3-nitroimidazo[1,2-b]pyridazine |  |  | 8/10 | 6/10 | 3/10 |  |
| 6-dimethylamino-3-nitroimidazo[1,2-b]-pyridazine | 5/5 | 10/10 | 74/75 | 60/70 | 32/70 | 14/50 |
| 6-(4-methyl-1-piperazinyl)-3-nitroimidazo[1,2-b]pyridazine | 5/5 |  | 2/5 |  |  |  |
| 6-diethylamino-3-nitroimidazo[1,2-b]-pyridazine |  | 9/10 | 44/59 |  |  |  |
| 6-methylamino-3-nitroimidazo[1,2-b]-pyridazine |  | 9/10 | 8/15 | 9/10 | 8/10 | [b] |
| 6-amino-3-nitroimidazo[1,2-b]pyridazine |  | 10/10 | 81/84 | 48/69 | 25/70 | 4/49 |
| 6-(3-methoxypropylamino)-3-nitroimidazo[1,2-b]pyridazine |  | 2/10 | [b] |  |  |  |
| 6-[(p-methoxyphenyl)-1-piperazinyl]-3-nitroimidazo[1,2-b]-pyridazine |  | 2/10 |  |  |  |  |
| 6-di(n-butyl)amino-3-nitroimidazo[1,2-b]pyridazine |  | 10/10 | 5/10 |  |  |  |
| 3-nitro-6-(1-pyrrolidino)imidazo[1,2-b]-pyridazine |  | 10/10 | [b] |  |  |  |
| 6-morpholino-3-nitroimidazo[1,2-b]pyridazine |  | 10/10 | 5/10 |  |  |  |
| 6-benzylmethylamino)-3-nitroimidazo[1,2-b]-pyridazine |  | 10/10 | [b] |  |  |  |
| 6-[bis(2-hydroxyethyl)-amino]-3-nitroimidazo-[1,2-b]pyridazine |  | 6/10 | [b] |  |  |  |
| 6-allylamino-3-nitroimidazo[1,2-b]pyridazine |  | 10/10 |  |  |  |  |
| 3-nitro-6-piperidinoimidazo[1,2-b]-pyridazine |  | 10/10 |  |  |  |  |
| 6-cyclohexylamino-3-nitroimidazo[1,2-b]-pyridazine |  | 10/10 |  |  |  |  |
| 6-ethylmethylamino-3-nitromidazo[1,2-b]-pyridazine |  | 10/10 |  |  |  |  |
| 6-(n-butyl)methyl-amino-3-nitroimidazo-[1,2-b]pyridazine |  | 10/10 |  |  |  |  |
| 6-cyclopropylamino-3-nitroimidazo[1,2-b]-pyridazine |  | 10/10 |  |  |  |  |
| 6-(4-carbethoxy-1-piperazinyl)-3-nitroimidazo[1,2-b]pyridazine |  | 4/10 |  |  |  |  |
| 6-n-butylamino-3-nitroimidazo[1,2-b]-pyridazine |  | 10/10 |  |  |  |  |
| 6-(N-methyl n-octylamino)-3-nitroimidazo[1,2-b]pyridazine hydrochloride | 4/10 |  |  |  |  |  |
| 6-allyloxy-3-nitroimidazo[1,2-b]-pyridazine |  | 2/5 |  |  |  |  |
| 6-(2-dimethylaminoethoxy)-3-nitroimidazo[1,2-b]-pyridazine |  | 7/10 | 5/10 | 3/10 |  |  |
| 6-(2-ethoxyethoxy)-3-nitroimidazo[1,2-b]-pyridazine |  | 10/10 | 8/10 | 3/10 |  |  |
| 6-isopropoxy-3-nitroimidazo[1,2-b]-pyridazine |  | 8/10 | 0/10 | 2/10 |  |  |
| 6-n-propoxy-3-nitroimidazo[1,2-b]-pyridazine |  | 10/10 | 10/10 | 9/10 | 3/10 |  |
| 6-(2-hydroxy-ethoxy)-3-nitroimidazo[1,2-b]-pyridazine |  | 10/10 | 6/10 | 6/10 | 6/10 |  |

[a] Number in which no motile trichomonads were observed five days post treatment.
[b] Inactive at the dosage indicated.

Compositions containing the 6-mono or 2,6-disubstituted-3-nitroimidazo[1,2-b]pyridazines may be administered to warm-blooded animals orally, or parentally if desired, and when so administered, may be considered as an agent for therapeutically desirable treatment of amebic or trichomonal infections in daily doses ranging from about 0.5 mg. to about 30 mg. per kilogram. The dosage regimen can be adjusted to provide optimum therapeutic response. Thus, for example, several smaller doses may be administered daily, or the dose may be reduced or increased proportionately as indicated by the requirements or the particular therapeutic situation.

For therapeutic administration the active compounds of this invention may be incorporated with pharmaceutical acceptable carriers such as excipients and used, for example, in the form of tablets, dragees, capsules, suppositories, liquids, elixirs, emulsions, suspensions or the like. Such compositions and preparations should contain at least 0.1% active component. The percentage in the compositions and preparations, may of course, be varied, and may conveniently be between 2% and 60% or more of the weight of the unit. The amount of compound in such therapeutically useful compositions or preparations is such that a suitable dosage will be obtained. Preferred compositions or preparations according to the present invention are prepared so that a dosage unit form contains between about 10 and about 300 milligrams of the active compound. Obviously, in addition to the therapeutic compound, there may be present excipients, binders, fillers and other therapeutically inert ingredieints necessary in the formulation of the desired pharmaceutical preparation.

SPECIFIC DESCRIPTION

The following examples describe in detail the preparation of representative compounds of this invention and formulations using said compounds.

EXAMPLE 1

Preparation of 6-Methoxy-3-nitroimidazo[1,2-b] pyridazine

A. Seven grams of 6-methoxyimidazo[1,2-b]pyridazine (J. G. Lombardino, *J. Het. Chem.* 5 35 (1968)) is added in small portions to 21 ml. of concentrated sulfuric acid, the temperature being held below 10° C. by external cooling. The resultant solution is stirred and the temperature maintained below 13° C. by external cooling as 7.3 ml. of 70% nitric acid is added dropwise. The reaction mixture is allowed to warm to room temperature and stirred for an additional hour. It is then drowned into 150 ml. of ice and water. The pale yellow precipitate is collected, washed free of acid with cold water, and dried. Recrystallization from ethanol gives 4.0 grams of pure product melting at 152.5°–154.5° C.

*Analysis.*—Calcd. for $C_7H_6N_4O_3$: C, 43.30; H, 3.12; N, 28.86. Found: C, 43.16; H, 3.19; N, 29.04.

B. Alternatively, the above compound is prepared by warming equimolar quantities of 6-chloro-3-nitroimidazo-[1,2-b]pyridazine and sodium methoxide dissolved in a solvent (such as, methanol, dioxane, dimethylformamide) until completion of the reaction. The solvent is removed under reduced pressure and inorganic salts by washing with water. Purification is carried as described in A above.

C. The subject compound can also be prepared by stirring a suspension of the sodium salt of 6-hydroxy-3-nitroimidazo[1,2-b]pyridazine (Example 3) in dimethylformamide with an excess of methyl iodide until a clear solution is obtained. Isolation and purification is effected as described in A above.

EXAMPLE 2

Preparation of 6-Ethoxy-3-nitroimidazo[1,2-b] pyridazine

The preparation of the subject compound is carried out essentially as described in the procedure of Example 1A, an equivalent of 6-ethoxyimidazo[1,2-b]pyridazine replacing the 6-methoxyimidazo[1,2-b]pyridazine. After recrystallization from ethanol, the compound melts at 149°–151° C.

*Analysis.*—Calcd. for $C_8H_8N_4O_3$: C, 46.15; H, 3.87; N, 26.92. Found: C, 46.13; H, 3.78; N, 27.00.

EXAMPLE 3

Preparation of 6-Hydroxy-3-nitroimidazo[1,2-b] pyridazine

A solution of 5.4 grams of 6-hydroxyimidazo[1,2-b]-pyridazine in 50 ml. of concentrated sulfuric acid is stirred at room temperature as 5 ml. of red fuming nitric acid is added dropwise. The mixture is then stirred and heated on the steam bath for six hours. After cooling to room temperature, the solution is poured into 500 grams of ice and water. The pale yellow precipitate is collected, washed free of acid, and dried. Recrystallization from a mixture of ethanol and dimethylforamide gives 2.8 grams of pure product, melting at 305°–310° C. with decomposition.

Alternatively, the subject compound is prepared by heating the compound of Example 1 with 48% hydrobromic acid at reflux for sixteen hours, followed by removal of the aqueous acid under reduced pressure, and purification of the residue as described above.

*Analysis.*—Calcd. for $C_6H_4N_4O_3$: C, 40.01; H, 2.24; N, 31.11. Found: C, 39.55; H, 2.16; N, 30.96.

EXAMPLE 4

Preparation of 6-Methoxy-2-methyl-3-nitroimidazo[1,2-b]pyridazine

The title compound is prepared essentially by the procedure of Example 1A an equivalent of 6-methoxy-2-methylimidazo[1,2-b]pyridazine (prepared as described by J. G. Lombardino, J. Het. Chem. 5 35 (1968)) replacing the 6-methoxyimidazo[1,2-b]pyridazine. Recrystallization from ethanol gives the pure compound, melting at 170°–173° C.

*Analysis.*—Calcd. for $C_8H_8N_4O_3$: C, 46.15; H, 3.87; N, 26.92. Found: C, 46.14; H, 4.04; N, 27.01.

EXAMPLE 5

Preparation of 6-Methylthio-3-nitroimidazo[1,2-b]pyridazine

Methyl mercaptan is bubbled through a solution of 0.6 gram of sodium methoxide in 50 ml. of methanol for fifteen minutes. Two grams of 6 - chloro - 3 - nitroimidazo-[1,2-b]pyridazine is then added, and the mixture placed in a stoppered flask and stirred for two hours. The precipitate present is collected, washed with water, dried, and recrystallized from ethanol to give the pure compound, melting at 174°–176°C.; yield, 1.9 grams.

*Analysis.*—Calcd. for $C_7H_6N_4SO_2$: C, 40.00; H, 2.88; N, 26.66. Found: C, 40.24; H, 2.91; N, 26.91.

EXAMPLE 6

Preparation of 6-n-Butoxy-3-nitroimidazo[1,2-b]pyridazine

One and six-tenths grams of 60% sodium hydroxide dispersion in mineral oil is added to 100 ml. of n-butanol, and the mixture stirred until complete solution is effected. 6.0 grams of 6-chloro-3-nitroimidazo[1,2-b]pyridazine is then added to the solution, and the mixture is stirred at room temperature until the reaction is completed. The precipitate is collected, washed with water, and dried. Recrystallization from methanol gives the pure compound, melting at 85°–88° C.; yield, 3.8 grams.

*Analysis.*—Calcd. for $C_{10}H_{12}N_4O_3$: C, 50.84; H, 5.12; N, 23.72. Found: C, 50.47; H, 5.09; N, 23.82.

EXAMPLE 7

Preparation of 6-Benzyloxy-3-nitroimidazo[1,2-b]pyridazine

One and six-tenths grams of 50% sodium hydride dispersion in mineral oil is added to a solution of 3.45 ml. of benzyl alcohol in 100 ml. of dioxane. The mixture is stirred at room temperature until gas evolution ceases. 6.0 grams of 6-chloro-3-nitroimidazo[1,2-b]pyridazine is added to the mixture, which is stirred until reaction is completed. The precipitate is collected, washed with water, and dried. Recrystallization from ethanol gives 1.9 grams of the pure compound, melting at 155.5°–157.5° C.

*Analysis.*—Calcd. for $C_{13}H_{10}N_4O_3$: C, 57.77; H, 3.37; N, 20.73. Found: C, 58.13; H, 3.72; N, 20.99.

EXAMPLE 8

Preparation of 6-(Carbethoxymethoxy)-3-nitroimidazo[1,2-b]pyridazine

A stirred solution of 7.2 grams of 6-hydroxy-3-nitroimidazo[1,2-b]pyridazine (Example 3) in 200 ml. of dry dimethylformamide is treated with 2.5 grams of 95% sodium methoxide. After fifteen minutes, the thick yellow suspension of the sodium salt of the starting compound is treated with 7.5 ml. (excess) of ethyl bromoacetate. A clear solution is obtained in two hours. After stirring for an additional fourteen hours, the solution is concentrated to dryness under reduced pressure. Inorganic salts are removed by extraction with 250 ml. of water. The insoluble residue is recrystallized from ethanol, yielding 7.6 grams of the subject compound, melting at 123–124° C.

*Anal.*—Calcd. for $C_{10}H_{10}N_4O_5$: C, 45.11; H, 3.79; N, 21.05. Found: C, 44.80; H, 3.73; N, 21.39.

EXAMPLE 9

Preparation of 6-Allyloxy-3-nitroimidazo[1,2-b]pyridazine

The above compound is prepared essentially by the procedure of Example 8, 4.9 grams of allyl bromide replacing the ethyl bromoacetate. After recrystallization from ethanol, 4.1 grams of pure compound is obtained, melting at 124°–125° C.

*Anal.*—Calcd. for $C_9H_8N_4O_3$: C, 49.09; H, 3.66; N, 25.44. Found: C, 48.30; H, 3.52; N, 25.62.

EXAMPLE 10

Preparation of 6-(p-Chlorophenacyloxy)-3-nitroimidazo[1,2-b]pyridazine

The subject compound is prepared essentially by the procedure of Example 8, 7.3 grams of 2-bromo-4'-chloroacetaphenone replacing the ethyl bromoacetate. After recrystallization from a mixture of ethanol and dimethylformamide, 4.7 grams of the pure compound is obtained, melting at 223°–225° C. with decomposition.

*Anal.*—Calcd. for $C_{14}H_9N_4O_4Cl$: C, 50.54; H, 2.73; Cl, 10.66. Found: C, 50.63; H, 2.67; Cl, 11.06.

EXAMPLE 11

Preparation of 1,2-Bis(3-nitroimidazo[1,2-b]pyridazine-6-yloxy)ethane

The subject compound is prepared essentially by the procedure of Example 8, 3.7 grams of 1,2-dibromoethane replacing the ethyl bromoacetate. After recrystallizaiton from a mixture of ethanol and dimethylformamide, the product melts at 257°–259° C. with decomposition.

*Anal.*—Calcd. for $C_{14}N_{10}N_8O_6$: C, 43.33; H, 2.61; N, 29.01. Found: C, 43.70; H, 2.82; N, 29.50.

EXAMPLE 12

Preparation of 6-(2-Ethoxyethoxy)-3-nitroimidazo[1,2-b]pyridazine

The subject compound is prepared essentially by the procedure of Example 8, 5.6 grams of 2-bromodiethylether replacing the ethyl bromoacetate. After recrystallization from ethanol, 3.9 grams of pure product is obtained, melting at 125°–126° C.

*Anal.*—Calcd. for $C_{10}H_{12}N_4O_4$: C, 47.62; H, 4.80; N, 22.21. Found: C, 47.56; H, 4.55; N, 22.45.

EXAMPLE 13

Preparation of 6-(2-Dimethylaminoethoxy)-3-nitroimidazo[1,2-b]pyridazine hydrochloride The free base of the subject compound is prepared essentially by the procedure of Example 7, 3.0 grams of 2-dimethylaminoethanol replacing the benzyl alcohol. This is dissolved in acetone and treated with a slight excess of hydrogen chloride in isopropanol solution. The resultant yellow precipitate is recrystallized from methanol to yield 2.3 grams of the pure compound, melting at 223°–226° C. (with decomposition).

*Anal.*—Calcd. for $C_{10}H_{13}N_5O_3 \cdot HCl$: C, 41.74; H, 4.90; N, 24.34; Cl, 12.32. Found: C, 41.81; H, 4.99; N, 24.25; Cl, 12.55.

EXAMPLE 14

Preparation of 6 *n*-Propyloxy-3-nitroimidazo[1,2-b]pyridazine

The above compound is prepared essentially by the procedure of Example 6, 100 ml. of *N*-propanol replacing the *N*-butanol. Recrystallization of the product from 400 ml. of methanol gives 4.7 grams of the pure compound, melting at 161°–164° C.

*Analysis.*—Calcd. for $C_9H_{10}N_4O_3$: C, 48.65; H, 4.54; N, 25.27. Found: C, 48.61; H, 4.52; N, 25.44.

EXAMPLE 15

Preparation of 6-*Iso*-Propyloxy-3-nitroimidazo[1,2-b]pyridazine

The subject compound is prepared essentially by the procedure of Example 6, 100 ml. of *iso*-propanol replacing the *N*-butanol. Recrystallization from 200 ml. of methanol gives 4.5 grams of the pure compound, melting at 154°–157° C.

*Analysis.*—Calcd. for $C_9H_{10}N_4O_3$: C, 48.65; H, 4.54; N, 25.22. Found: C, 48.61; H, 4.43; N, 25.47.

EXAMPLE 16

Preparation of 6-(2-Hydroxyethoxy)-3-nitroimidazo[1,2-b]pyridazine

The above compound is prepared essentially by the procedure described in Example 8. An equivalent of 2-bromoethanol replacing the ethyl bromoacetate. The reaction is brought to completion by a final heating on the steam bath for 45 minutes. Recrystallization from 250 ml. of ethanol gives 4.0 grams of the pure compound, melting at 178°–180° C.

*Analysis.*—Calcd. for $C_8H_8N_4O_4$: C, 42.86; H, 3.60; N, 24.99. Found: C, 42.73; H, 3.53; N, 24.69.

EXAMPLE 17

Preparation of 6-n-Octyloxy-3-nitroimidazo[1,2-b]pyridazine

The subject compound is prepared by the procedure described in Example 8, an equivalent of 1-bromooctane replacing the ethyl bromoacetate. The reaction is brought to completion by a final heating for two hours on the steam bath. Recrystallization from 150 ml. of ethanol gives 3.1 grams of the pure compound, melting at 65°–67° C.

*Analysis.*—Calcd. for $C_{14}H_{20}N_4O_3$: C, 57.52; H, 6.90; N, 19.17. Found: C, 57.15; H, 6.80; N, 19.16.

EXAMPLE 18

Preparation of 3-Nitro-6-(2-phthalimidoethoxy)imidazo-[1,2-b]pyridazine

The above compound is prepared essentially by the procedure of Example 8, an equivalent of N-(2-bromoethyl) phthalimide replacing the ethyl bromoacetate. The reaction is brought to completion by heating on the steam bath for 4 hours. Recrystallization from 250 ml. of 2-methoxyethanol gives 2.9 grams of purified compound, melting at 260°–265° C. with decomposition.

*Analysis.*—Calcd. for $C_{16}H_{11}N_5O_5$: C, 54.39; H, 3.14; N, 19.82. Found: C, 53.93; H, 3.08; N, 19.51.

EXAMPLE 19

Preparation of 6-Dimethylamino-3-nitroimidazo-[1,2-b]pyridazine

A. A suspension of 6 grams of 6-chloro-3-nitroimidazo-[1,2-b]pyridazine (prepared as described by J. Kobe et al. hereinbefore) in 250 ml. of hot ethanol is stirred as a stream of gaseous dimethylamine is passed in for a period of 30 minutes. The reaction mixture is then placed in a stoppered flask and kept at room temperature for 3 hours. The yellow precipitate is collected and recrystallized from ethanol to give 4.7 grams of pure compound, melting at 186–188° C.

B. Alternatively, the title compound is prepared by heating a solution of 6-chloro-3-nitroimidazo[1,2-b]pyridazine in dimethylformamide for a period of 2–3 days. After removal of the solvent under reduced pressure, the residue is purified as described above.

*Analysis.*—Calcd. for $C_8H_9N_5O_2$: C, 46.37; H, 4.38; N, 33.80. Found: C, 45.95; H, 4.44; N, 33.82.

EXAMPLE 20

Preparation of 6-(4-Methyl-1-piperazinyl)-3-nitroimidazo-[1,2-b]pyridazine

A mixture consisting of 5 grams of 6-chloro-3-nitroimidazo[1,2-b]pyridazine, 5 grams of N-methylpiperazine, and 250 ml. of 2-methoxyethanol is stirred at reflux for 16 hours. The solvent is then removed under reduced pressure. The residue is shaken with 100 ml. of water containing 3 ml. of 10N sodium hydroxide solution. The insoluble yellow precipitate is collected, washed with water, dried and recrystallized from ethanol. There is obtained 3.2 grams of pure compound, melting at 151°–152° C.

*Analysis.*—Calcd. for $C_{11}H_{14}N_6O_2$: C, 50.37; H, 5.38; N, 32.05. Found: 50.01; H, 5.35; N, 31.79.

EXAMPLE 21

Preparation of 6-Diethylamino-3-nitroimidazo-[1,2-b]pyridazine

A mixture of 2 grams of 6-chloro-3-nitroimidazo[1,2-b]pyridazine, 1.6 g. of diethylamine, and 50 ml. of ethanol is stirred at refluxing temperatures for 24 hours, and then taken to dryness under reduced pressure. The residue is partitioned between equal volumes of water and chloroform. The chloroform layer is washed with water and dried over magnesium sulfate. Removal of the chloroform, and recrystallization of the residue from ethanol gives 1.2 grams of the pure compound, melting at 139°–141° C.

*Analysis.*—Calcd. for $C_{10}H_{13}N_5O_2$: C, 51.05; H, 5.57; N, 29.77. Found: C, 50.60; H, 5.42; N, 29.75.

EXAMPLE 22

Preparation of 6-Methylamino-3-nitroimidazo-[1,2-b]pyridazine

The above compound is prepared essentially by the procedure of Example 1, a stream of methylamine replacing the dimethylamine. After recrystallization from 2-methoxyethanol, the compound decomposes at temperatures above 324° C.

*Analysis.*—Calcd. for $C_7H_7N_5O_2$: C, 43.52; H, 3.65; N, 36.26. Found: C, 43.33; H, 3.60; N, 36.06.

EXAMPLE 23

Preparation of 6-Amino-3-nitroimidazo[1,2-b]pyridazine

The subject compound is prepared essentially by the procedure of Example 1, a stream of ammonia replacing the dimethylamine. The suspension is then heated on the steam bath for 24 hours before isolation of the product. After recrystallization from water, the pure compound melts at 310°–312° C. with decomposition.

*Analysis.*—Calcd. for $C_6H_5N_5O_2$: C, 40.23; H, 2.81; N, 39.10. Found: C, 40.16; H, 2.84; N, 39.16.

EXAMPLE 24

Preparation of 6-(3-Methoxypropylamino)-3-nitroimidazo-[1,2-b]pyridazine

A mixture of 2 grams of 6-chloro-3-nitroimidazo[1,2-b]pyridazine and 40 ml. of freshly distilled 3-methoxypropylamine is stirred at reflux (110°–115° C.) for 90 minutes. Excess amine is removed under reduced pressure.

The dark residue is triturated with ethanol, giving a dark green crystalline product. Recrystallization from methylene chloride gives 0.72 grams of pure product melting at 144.5°–146° C.

*Analysis.*—Calcd. for $C_{10}H_{13}N_5O_3$: C, 47.80; H, 5.22; N, 27.88. Found: C, 47.66; H, 5.22; N, 27.89.

EXAMPLE 25

Preparation of 6-Dimethylamino-2-methyl-3-nitroimidazo-[1,2-b]pyridazine

The above compound is prepared essentially as described in the procedure of Example 1, an equivalent of 6-chloro-2-methyl-3-nitroimidazo[1,2-b]pyridazine replacing the 6-chloro-2-methyl - 3 - nitroimidazo[1,2-b]pyridazine. Recrystallization from ethanol gives the pure compound, melting at 175–176° C.

*Analysis.*—Calcd. for $C_9H_{11}N_5O_2$: C, 48.66; H, 5.01; N, 31.66. Found: C, 49.01; H, 5.06; N, 31.92.

EXAMPLE 26

Preparation of 6-(1-Imidazolyl)-3-nitroimidazo-[1,2-b]pyridazine

A mixture consisting of 6 grams of 6-chloro-3-nitroimidazo[1,2-b]pyridazine, 4.5 grams of imidazole, and 120 ml. of ethanol is stirred at the boiling point for four days. The mixture is then concentrated to about 40 ml. volume, cooled, and the resultant precipitate collected. It is purified by solution in hot 1N hydrochloric acid solution, clarification and neutralization with ammonium hydroxide 5.8 grams of pale yellow crystals is obtained possessing a melting point of 238°–241° C.

*Analysis.*—Calcd. for $C_9H_6N_6O_2$: C, 46.96; H, 2.63; N, 36.53. Found: C, 46.81; H, 2.62; N, 36.76.

EXAMPLE 27

Preparation of 6-(p-Methoxyphenyl)-1-piperazinyl)-3-nitroimidazo[1,2-b]pyridazine A mixture consisting of 1.9 grams of 1-(p-methoxyphenyl)piperazine, 2 grams of 6-chloro-3-nitroimidazo[1,2-b]pyridazine, and 50 ml. of ethanol is stirred at reflux temperature for 24 hours and then cooled. The precipitate is collected, washed with ethanol, dried and recrystallized from 2-methoxyethanol to yield 1.6 grams of pure compound, melting at 231–232° C.

*Analysis.*—Calcd. for $C_{17}H_{18}N_6O_3$: C, 57.62; H, 5.12; N, 23.72. Found: 57.67; H, 5.15; N, 23.78.

EXAMPLE 28

Preparation of 6-Di(n-Butyl)amino-3-nitroimidazo-[1,2-b]pyridazine

A mixture consisting of 1 gram of 6-chloro-3-nitroimidazo[1,2-b]pyridazine, 1.3 grams of di-(n-butyl)amine, and 50 ml. of ethanol is heated at 95°–100° C. in a pressure bottle for 3 days. The reaction mixture is concentrated under reduced pressure. The residue is recrystallized from aqueous ethanol to give 0.65 gram of pure compound, melting at 84°–86° C.

*Analysis.*—Calcd. for $C_{14}H_{21}N_5O_2$: C, 57.71; H, 7.27; N, 24.04. Found: C, 57.53; H, 7.12; N, 23.97.

EXAMPLE 29

Preparation of 3-Nitro-6-(1-pyrrolidino)imidazo-[1,2-b]pyridazine

A mixture consisting of 4 grams of 6-chloro-3-nitroimidazo[1,2-b]pyridazine, 3 grams of pyrrolidine, and 100 ml. of ethanol is stirred at reflux for 5 days, and then cooled. The precipitate present is collected, washed with water, dried and recrystallized from ethanol to give 3.8 grams of pure product, melting at 157°–158° C.

*Analysis.*—Calcd. for $C_{10}H_{11}N_5O_2$: C, 51.49; H, 4.75; N, 30.03. Found: C, 51.27; H, 4.68; N, 30.09.

EXAMPLE 30

Preparation of 6-Morpholino-3-nitroimidazo-[1,2-b]pyridazine

The preparation of the subject compound is carried out essentially as described in the procedure of Example 11, 3.5 grams of morpholine replacing the pyrrolidine. There is obtained 3.6 grams of pure product, melting at 211°–212° C.

*Analysis.*—Calcd. for $C_{10}H_{11}N_5O_3$: C, 48.19; H, 4.45; N, 28.10. Found: C, 48.13; H, 4.45; N, 28.43.

EXAMPLE 31

Preparation of 6-Allylamino-3-nitroimidazo-[1,2-b]pyridazine

A mixture consisting of 6 grams of 6-chloro-3-nitroimidazo[1,2-b]pyridazine, 4 grams of allylamine, and 100 ml. of ethanol is stirred at the reflux temperature for 16 hours, and then cooled. The resultant precipitate is collected, washed with water and ethanol, and dried. Recrystallization from ethanol gives 3.5 grams of pure compound, melting at 187°–189° C.

*Analysis.*—Calcd. for $C_9H_9N_5O_2$: C, 49.31; H, 4.14; N, 31.45. Found: C, 48.88; H, 4.03; N, 32.14.

EXAMPLE 32

Preparation of 6-[bis(2-Hydroxyethyl)amino]-3-nitroimidazo[1,2-b]pyridazine

A mixture consisting of 2 grams of 6-chloro-3-nitroimidazo[1,2-b]pyridazine, 2.1 grams of diethanolamine, and 50 ml. of ethanol is stirred at reflux for 20 hours and then cooled. The precipitate is collected, dried, and extracted with warm chloroform. The chloroform insoluble fraction is collected and recrystallized from ethanol to yield the pure compound, melting at 184°–185° C.

*Analysis.*—Calcd. for $C_{10}H_{13}N_5O_4$: C, 44.94; H, 4.90; N, 26.21. Found: C, 44.87; H, 4.79; N, 26.55.

EXAMPLE 33

Preparation of 6-(Benzylmethylamino)-3-nitroimidazo-[1,2-b]pyridazine

The subject compound is prepared essentially by the procedure of Example 13, 7.3 grams of benzylmethylamine replacing the allylamine. There is obtained 5.1 grams of pure product, melting at 109°–110° C.

*Analysis.*—Calcd. for $C_{14}H_{13}N_5O_2$: C, 59.35; H, 4.63; N, 24.72. Found: C, 59.13; H, 4.52; N, 24.43.

EXAMPLE 34

Preparation of 6-Cyclohexylamino-3-nitroimidazo-[1,2-b]pyridazine

The subject compound is prepared essentially by the procedure of Example 13, 7 grams of cyclohexylamine replacing the allylamine. After recrystallization from 50% aqueous ethanol, there is obtained 1.2 grams of pure compound, melting at 184°–186° C.

*Analysis.*—Calcd. for $C_{12}H_{15}N_5O_2$: C, 55.16; H, 5.79; N, 26.80. Found: C, 55.15; H, 5.82; N, 27.25.

EXAMPLE 35

Preparation of 3-Nitro-6-piperidinoimidazo-[1,2-b]pyridazine

The above compound is prepared essentially by the procedure of Example 13, 6 grams of piperidine replacing the allylamine. After recrystallization from 50% aqueous ethanol, there is obtained 4.0 grams of pure product, melting at 125°–126° C.

*Analysis.*—Calcd. for $C_{11}H_{13}N_5O_2$: C, 53.43; H, 5.30; N, 28.33. Found: C, 53.29; H, 5.27; N, 28.37.

EXAMPLE 36

Preparation of 6-Ethylmethylamino-3-nitroimidazo-[1,2-b]pyridazine

The subject compound is prepared essentially as described in Example 10, an equivalent of ethylmethylamine replacing the di(n-butyl)amine. The crude product is purified by recrystallization from a mixture of methylene chloride and 25°–60° C. boiling petroleum ether. It then melts at 101°–103° C.

*Analysis.*—Calcd. for $C_9H_{11}N_5O_2$: C, 48.86; H, 5.01; N, 31.66. Found: C, 49.08; H, 4.91; N, 32.08.

EXAMPLE 37

Preparation of 6-(n-Butyl)methylamino-3-nitroimidazo[1,2-b]pyridazine

The subject compound is prepared by the procedure of Example 13, 5.25 grams of (n-butyl)methylamine replacing the allylamine. After recrystallization from ethanol, the pure product melts at 110°–112° C.; yield, 5.2 grams.

*Analysis.*—Calcd. for $C_{11}H_{15}N_5O_2$: C, 53.00; H, 6.07; N, 28.10. Found: C, 52.79; H, 6.16; N, 28.19.

EXAMPLE 38

Preparation of 6-Cyclopropylamino-3-nitroimidazo-[1,2-b]pyridazine

A mixture consisting of 4 grams of 6-chloro-3-nitroimidazo[1,2-b]pyridazine, 1.8 grams of cyclopropylamine, 2 grams of triethylamine, and 75 ml. of ethanol is heated in a pressure flask on the steam bath for 24 hours. The reaction mixture is cooled, the precipitate is collected, washed with water and ethanol, and dried. Recrystallization from 95% aqueous ethanol gives 3.2 grams of pure product, melting at 196°–197° C.

*Analysis.*—Calcd. for $C_9H_9N_5O_2$: C, 49.31; H, 4.14; N, 31.95. Found: C, 49.23; H, 4.29; N, 31.93.

EXAMPLE 39

Preparation of 6-(4-Carbethoxy-1-piperazinyl)-3-nitroimidazo[1,2-b]pyridazine

The preparation of the subject compound is carried out using the procedure of Example 13, 10 grams of N-carbethoxypiperazine replacing the allylamine. After recrystallization from ethanol, there is obtained 5.5 grams of pure product, melting at 197°– 198° C.

*Analysis.*—Calcd. for $C_{13}H_{16}N_6O_4$: C, 48.74; H, 5.04; N, 26.24. Found: C, 48.47; H, 4.97; N, 26.43.

EXAMPLE 40

Preparation of 6-(2-Diethylaminoethylamino)-3-nitroimidazo[1,2-b]pyridazine dihydrochloride A mixture consisting of 6 grams of 6-chloro-3-nitroimidazo[1,2-b]pyradazine, 7 grams of N,N-diethylethylenediamine, and 100 ml. of ethanol is stirred at reflux temperature for five hours, and then concentrated to an oil under reduced pressure. This oil is treated with 10 ml. of 10N sodium hydroxide solution, and solid sodium carbonate is then added until saturation is achieved. The mixture is extracted with three 150 ml. portions of chloroform. The combined chloroform extracts are dried, and the chloroform removed under reduced pressure. The residual oily free base is converted to its dihydrochloride salt with ethanolic hydrogen chloride. Recrystallization from ethanol yields 2.2 grams of pure compound, melting at 259°–263° C. with decomposition.

*Analysis.*—Calcd. for $C_{12}H_{18}N_6O_2 \cdot 2HCl$: C, 45.78; H, 6.08; N, 26.70; Cl, 11.26. Found: C, 45.70; H, 6.13; N, 26.61; Cl, 11.67.

EXAMPLE 41

Preparation of 6-(3-Dimethylaminopropylamino)-3-nitroimidazo[1,2-b]pyridazine

The subject compound is prepared essentially by the procedure of Example 22, 6.2 grams of N,N-dimethyl-1,3-propylenediamine replacing the N,N-diethylethylenediamine. The crude free base crystallizes upon cooling. Recrystallization from acetonitrile gives 5.0 grams of pure compound, melting at 103°–106° C.

*Analysis.*—Calcd. for $C_{11}H_{16}N_6O_2$: C, 49.99; H, 6.10; N, 31.80. Found: C, 49.98; H, 5.96; N, 32.00.

EXAMPLE 42

Preparation of 6-n-Butylamino-3-nitroimidazo[1,2-b]pyridazine

A mixture composed of 6.5 grams of 6-chloro-3-nitroimidazo[1,2-b]pyridazine, 20 ml. of N-butylamine and 50 ml. of n-propanol is stirred at reflux temperature for 16 hours, and then concentrated under reduced pressure. The residue is dissolved in dilute hydrochloric acid and extracted with chloroform. The aqueous acid layer is made alkaline and extracted with chloroform. The chloroform extract is passed through alumina powder, and then concentrated under reduced pressure. Recrystallization of the residue from ethanol gives 3.1 grams of pure compound, melting at 125°–126° C.

*Analysis.*—Calcd. for $C_{10}H_{13}N_5O_2$: C, 51.06; H, 5.58; N, 29.77. Found: C, 50.64; H, 5.48; N, 29.72.

EXAMPLE 43

Preparation of 6-n-Octylamino-3-nitroimidazo[1,2-b]pyridazine

The above compound is prepared essentially by the procedure of Example 24, 9.1 grams of n-octylamine replacing the n-butylamine. Recrystallization from a benzene-heptane mixture gives 8.8 grams of pure compound, melting at 85.5°–86° C.

*Analysis.*—Calcd. for $C_{14}H_{21}N_5O_2$: C, 57.71; H, 7.26; N, 24.04. Found: C, 57.60; H, 7.31; N, 23.69.

EXAMPLE 44

Preparation of 6-Dimethylamino-3-nitroimidazo[1,2-b]pyridazine Methyl p-Toluenesulfonate The product of Example 1 (1.5 grams) is mixed with 3 ml. of methyl p-toluenesulfonate, and the mixture heated on the steam bath for 20 hours. The oily reaction product is recrystallized from isopropanol to yield 2.5 grams of pure product, melting at 223°–226° (dec.).

*Analysis.*—Calcd. for $C_{16}H_{19}N_5SO_5$: C, 48.84; H, 4.87; N, 17.80; S, 8.15. Found: C, 48.59; H, 4.58; N, 17.79; S, 8.10.

EXAMPLE 45

Preparation of 6-(dl-1-Hydroxy-2-butylamino)-3-nitroimidazo[1,2-b]pyridazine

A mixture consisting of 6 grams of 6-chloro-3-nitroimidazo[1,2-b]pyridazine, 5.5 grams of dl-2-amino-1-butanol, and 50 ml. of n-propanol is stirred at reflux for seven days, and then concentrated under reduced pressure. The residue is shaken with a mixture of 50 ml. of water and 50 ml. of chloroform. The yellow precipitate that separates from the mixture is collected and recrystallized from acetone to give 3.1 gram of pure product melting at 175°–176° C.

*Anal.*—Calcd. for $C_{10}H_{13}N_5O_3$: C, 47.80; H, 5.22; N, 27.87. Found: C, 47.82; H, 5.18; N, 28.27.

EXAMPLE 46

Preparation of 6-[4-(3-Dimethylaminopropyl)-1-piperazinyl] - 3 - nitroimidazo[1,2 - b]pyridazine Dihydrochloride The preparation of the above compound is carried out essentially by the procedure described in Example 22, 10.4 grams of N-(3-dimethylaminopropyl)piperazine replacing the N,N-diethylethylenediamine. It is dissolved in acetone and treated with dry hydrogen chloride in isopropanol, giving the crude dihydrochloride salt. Recrystallization from aqueous ethanol gives 3.2 grams of pure compound, decomposing above 300° C.

Analysis.—Calcd. for $C_{15}H_{23}N_7O_2 \cdot 2HCl$: C, 44.34; H, 6.20; N, 24.13; Cl, 17.45. Found: C, 44.17; H, 6.23; N, 24.30; Cl, 17.04.

EXAMPLE 47

Preparation of 6-(N-Methyl n-octylamino)-3-nitro-imidazo[1,2-b]pyridazine Hydrochloride The free base of the subjectt compound is prepared following the procedure of Example 24, 8.7 grams of N-methyl n-octylamine replacing the n-butylamine. It is dissolved in ether and treated with anhydrous hydrogen chloride in isopropanol to yield 5.7 grams of the hydrochloride salt, decomposing over the range of 145°–172° C.

Analysis.—Calcd. for $C_{15}H_{23}N_5O_2 \cdot HCl$: C, 52.70; H, 7.08; N, 20.49; Cl, 10.37. Found: C, 52.65; H, 6.93; N, 20.36; Cl, 10.20.

EXAMPLE 48

Preparation of 6-Benzylamino-3-nitroimidazo[1,2-b]pyridazine

The above compound is prepared by the procedure of Example 24, 7.3 ml. of benzylamine replacing the n-butylamine. Recrystallization from ethanol gives 2.3 grams of pure compound, melting at 156°–158° C.

Anal.—Calcd. for $C_{13}H_{11}N_5O$: C, 57.98; H, 4.2; N, 26.01. Found: C, 57.73; H, 4.14; N, 25.91.

EXAMPLE 49

Preparation of 3-Nitro-6-(3-pyridylmethylamino)imidazo[1,2-b]pyridazine

The subject compound is prepared essentially by the procedure of Example 13, 6.4 grams of 3-pyridylmethylamine replacing the allylamine. Recrystallization from methanol gives 4.4 grams of pure product melting at 236°–238° C.

Analysis.—Calcd. for $C_{12}H_{10}N_6O_2$: C, 53.33; H, 3.73; N, 31.10. Found: C, 53.34; H, 3.64; N, 31.11.

EXAMPLE 50

Preparation of Hard Shell Capsules containing 6-methoxy-3-nitroimidazo[1,2-b]pyridazine

| | Per 1000 Capsules g. |
|---|---|
| 6-methoxy-3-nitroimidazo[1,2]pyridazine | 200.0 |
| Lactose | 900.0 |
| Magnesium stearate | 10.0 |

The ingredients are blended together. The mixture is used to fill hard shell capsules of a suitable size each containing 200 mg. of active compound.

EXAMPLE 51

Preparation of Tablet Compositions containing 6-n-butoxy-3-nitroimidazo[1,2-b]pyridazine

| | Per 1000 Tablets g. |
|---|---|
| 6-n-butoxyimidazo[1,2-b]pyridazine | 100.0 |
| Corn starch USP | 300.0 |
| Dibasic calcium phosphate | 2150.0 |
| Magnesium stearate | 600.0 |

EXAMPLE 52

Suppositories containing 6-diethylamino-3-nitroimidazo[1,2-b]-pyridazine

| | 30 suppositories g. |
|---|---|
| 6-diethylamino-3-nitroimidazo[1,2-b]pyridazine | 15 |
| Purified water qsAD | 20 |
| Gelatin granular | 20 |
| Glycerin | 140 |

Add the water to the medicinal substance to make 20 g. and dissolve or mix together. Add the glycerine and mix well. To the mixture add the gelatin carefully avoiding incorporation of air and heat on steam bath until gelatin is dissolved. Pour the melted mixture into 30 chilled molds and allow to congeal. Each suppository contains 500 mg. of therapeutic component.

EXAMPLE 53

Preparation of Hard Shell Capsules containing 6-amino-3-nitroimidazo[1,2-b]pyridazine

| | Per 1000 Capsules g. |
|---|---|
| 6-amino-3-nitroimidazo[1,2-b]pyridazine | 200.0 |
| Lactose | 900.0 |
| Magnesium stearate | 10.0 |

The ingredients are blended together. The mixture is used to fill hard shell capsules of a suitable size each containing 200 mg. of active component.

EXAMPLE 54

Preparation of Tablet Compositions Containing 6-Allylamino-3-nitroimidazo[1,2-b]pyridazine

| | Per 1000 Tablets g. |
|---|---|
| 6-allylamino-3-nitroimidazo[1,2-b]pyridazine | 100.0 |
| Corn starch USP | 300.0 |
| Dibasic calcium phosphate | 2150.0 |
| Magnesium stearate | 600.0 |

The above ingredients are thoroughly mixed and incorporated into a standard pharmaceutical tablet. Each tablet contains 100 mg. of therapeutic component.

We claim:
1. A nitroimidazopyridazine of the formula:

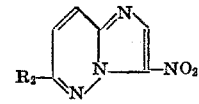

wherein $R_2$ is amino, alkyl $(C_1-C_8)$ amino or dialkyl $(C_1-C_8)$ amino.

2. The nitroimidazopyridazine in accordance with Claim 1, 6-dimethylamino-3-nitroimidazo[1,2-b]pyridazine.

3. The nitroimidazopyridazine in accordance with Claim 1, 6-amino-3-nitroimidazo[1,2-b]pyridazine.

4. The nitroimidazopyridazine in accordance with Claim 1, 6-methylamino-3-nitroimidazo[1,2-b]pyridazine.

5. The nitroimidazopyridazine in accordance with Claim 1, 6-di-(n-butyl)amino-3-nitroimidazo[1,2-b]pyridazine.

6. The nitroimidazopyridazine in accordance with Claim 1, 6-diethylamino-3-nitroimidazo[1,2-b]pyridazine.

7. The nitroimidazopyridazine in accordance with Claim 1, 6-ethylmethylamino-3-nitroimidazo[1,2-b]pyridazine.

8. The nitroimidazopyridazine in accordance with Claim 1, 6-(n-butyl)methylamino-3-nitroimidazo[1,2-b]-pyridazine.

9. The nitroimidazopyridazine in accordance with Claim 1, 6-n-butylamino-3-nitroimidazo[1,2-b]pyridazine.

10. The nitroimidazopyridazine in accordance with Claim 1, 6 - (n-octylamino-3-nitroimidazo[1,2-b]pyridazine.

References Cited

Stanovnik et al.: Chemical Abstract 68: 67307g.
Stanovnik et al.: Chemical Abstract 68; 29511g.
Pfizer & Co.: Chemical Abstract 70: 57870h.
Stanovnik et al.: Chemical Abstract 69: 67307y.
Yoneda et al.: Chem. Abstr. 62: 52746.

DONALD G. DAUS, Primary Examiner

R. McCLOUD, Assistant Examiner

U.S. Cl. X.R.

260—247.5 R, 268 BC; 424—250